United States Patent Office 3,140,289
Patented July 7, 1964

3,140,289
PROCESS FOR PREPARING METHYL PYRIDINIUM 2 ALDOXIME CHLORIDE
Robert I. Ellin, Baltimore, Md., David E. Easterday, Shawnee Mission, Kans., and Albert A. Kondritzer, Baltimore, Md., assignors to the United States of America as represented by the Secretary of the Army
No Drawing. Filed Apr. 11, 1962, Ser. No. 187,176
1 Claim. (Cl. 260—296)
(Granted under Title 35, U.S. Code (1952), sec. 266)

The invention described herein may be manufactured and used by or for the Government of the United States of America for governmental purposes without the payment to us of any royalty thereon.

This invention relates to a new process of preparing the compound 1-methylpyridinium-2-aldoxime chloride, also named 1 - methyl - 2 - hydroximinomethylpyridinium chloride and commonly referred to as 2-PAM chloride, by reacting pyridine-2-aldoxime with methyl chloride in the presence of N,N-dimethylformamide as the common solvent.

Prior to this invention 2-PAM chloride was prepared by reacting pyridine-2-aldoxime with methyl iodide in the presence of acetone to form 1-methylpyridinium-2-aldoxime iodide (2-PAM iodide), as described in the Wilson Patent No. 2,816,113. The 2-PAM iodide was in turn reacted with silver chloride to produce 2-PAM chloride. Obviously, a one step process would be very desirable to produce this extremely important compound, which is used with atropine to alleviate the deleterious effects of an anticholinesterase chemical, such as sarin, on animals and humans.

Syntheses in which the reactions were carried out in classical organic solvents such as acetone, ethyl alcohol, and benzene gave low yields. Similar studies with Gulf BT (a high boiling fraction of petroleum consisting mainly of aromatic hydrocarbons), tetrahydrofuran, and N,N-dimethylformamide were also unsuccessful. All of these tests were conducted at atmospheric pressures. However, a precipitate was noticed in one of the reaction flasks which had been standing in the laboratory for several weeks. This flask contained the N,N-dimethylformamide solvent. The precipitate was identified as 2-PAM chloride of a relatively high degree of purity. When the reaction was carried out in N,N-dimethylformamide at pressures greater than atmospheric, good yields of the quaternary salt were obtained. The yields and purity of 2-PAM chloride resulting from the reaction of methyl chloride and pyridine-2-aldoxime in N,N-dimethylformamide under pressure as a function of time were therefore determined. Molar ratios of methyl chloride to pyridine-2-aldoxime greater than 6:1 did not increase the yield of quaternary salt. When the first order rate constant of the formation of 2-PAM chloride is calculated with respect to the pyridine-2-aldoxime, using the method of least squares, a value of $6.9 \times 10^{-2}$ hr.$^{-1}$ is obtained, from which the half-life, $t-\frac{1}{2}$, is found to be 10.1 hours. The purity of the various yields of the quaternary chloride was between 98 and 100% by UV spectrophotometric analysis (Ref: Elin and Kondritzer, Analytical Chemistry, 31:200, 1959), indicating that impurities resulting from possible side reactions or the presence of unreacted oxime were at a minimum. After reaction times of 10–12 hours, the product was practically free of discoloration. From this time to 22 hours, the product had a grayish appearance, but was 98% pure. A white product is easily obtained after one recrystallization from ethanol. In addition, the final reaction product, 2-PAM chloride, is very slightly soluble in N,N-dimethylformamide and can be collected by simple filtration. The preceding findings indicate that the preparation could be made into a continuous process.

When acetone as taught by Wilson was used as a solvent for the reaction between pyridine-2-aldoxime and methyl chloride, only 12 percent yields were found at the higher pressures after 16 hours. In addition, the quaternary chloride must be precipitated with a solvent, such as ether, which also precipitates unreacted pyridine-2-aldoxime, resulting in a discolored product. It is evident that the Wilson teachings could not be employed to produce the chloride in good yield and would not be feasible for a commercial process. The success of the reaction appears to depend on the role of the solvent, N,N-dimethylformamide. The latter may have sufficient solvating power to induce increased polarity to methyl chloride.

The procedure is further illustrated by the following example without being restricted thereto. Pyridine-2-aldoxime, 2 grams, was dissolved in 20 ml. of N,N-dimethylformamide, contained in a pressure bottle. Methyl chloride was added by passing the gas through a large Dewar-type condenser that was packed with pulverized solid carbon dioxide. After addition of five grams of methyl chloride, the bottle was closed and placed inside a steel safety jacket, which was closed with a steel cap in which several small holes had been drilled. Steam was passed into the jacket, through an inlet tube, for periods up to 22 hours. The temperature within the jacket reached 95–100° C. Pressures up to 100 p.s.i. developed within the bottles, as determined by a few check experiments in which the reaction was carried out in small steel tubes with pressure gauges attached. At the end of the reaction time, the bottles were cooled to below room temperature and opened. The reaction products were filtered off, washed and dried. The chloride salts melted within a two degree range between 235°–238°, with decomposition.

For recrystallization, 1 gram of the product was dissolved in 30 ml. of 95% ethanol with heat, the solution filtered, and 50 ml. of ether added to the cooled solution with stirring. Crystallization was allowed to take place in the cold; the product was collected on a filter, washed with a small volume of a cold mixture of ethanol-ether (3:5) and dried in vacuo. The yield was 85–90%.

It is evident from the above disclosure that the use of N,N,-dimethylformamide in the reaction produced the unexpected result of a four fold increase in yield over the prior art teachings. In addition, the purity of the compound was greatly improved. We believe that such an improvement deserves the granting of a patent for our part in progressing the status of the art.

We claim:

A process of producing 1-methylpyridinium-2-aldoxime chloride comprising alkylating pyridine-2-aldoxime with methyl chloride in the presence of N,N-dimethylformamide solvent under super-atmospheric pressure.

References Cited in the file of this patent

UNITED STATES PATENTS

| | | |
|---|---|---|
| 2,816,113 | Wilson et al. | Dec. 10, 1957 |
| 2,966,493 | Allen et al. | Dec. 27, 1960 |
| 2,996,510 | Green | Aug. 15, 1961 |

OTHER REFERENCES

Klinksberg: "Pyridine and Its Deriv.," part 2, pages 2–3 (1961).